United States Patent Office.

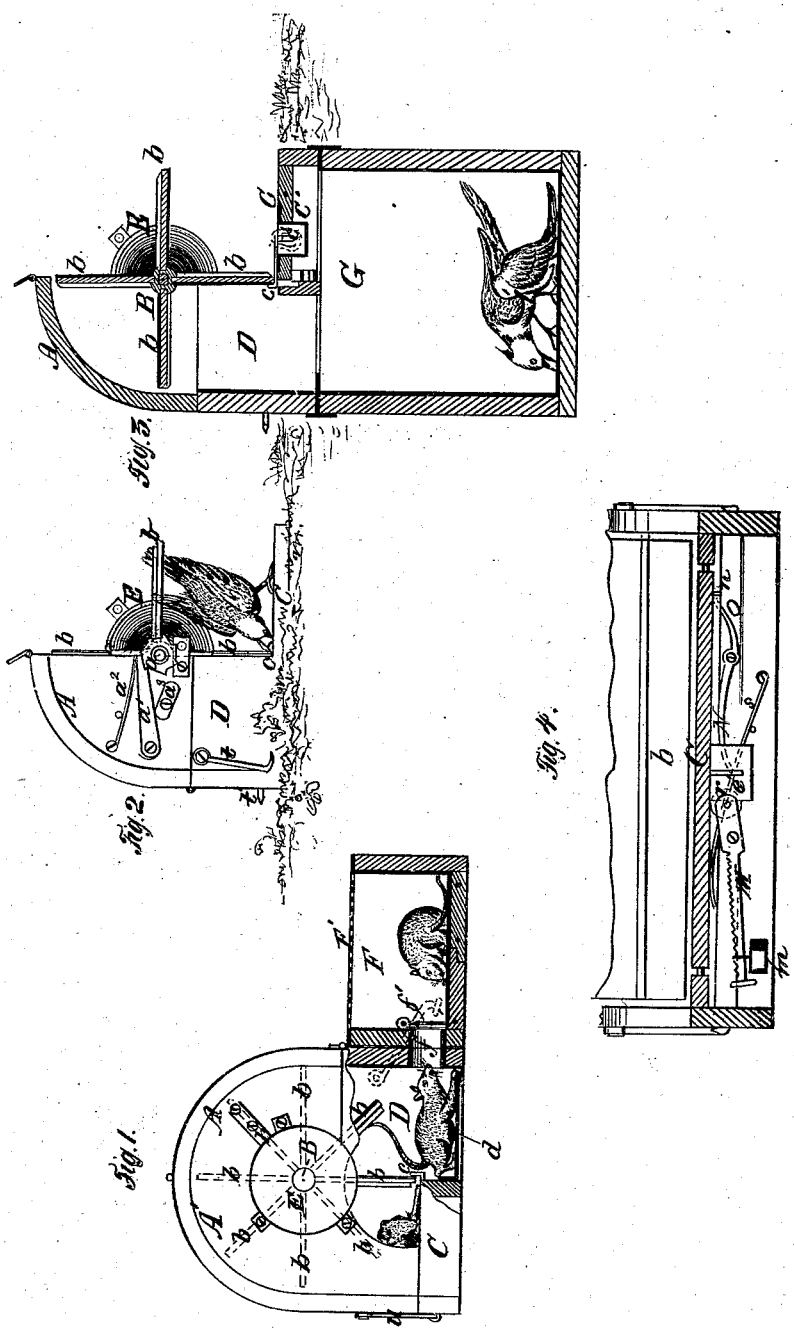

GREENVILLE CARTER STAMPER, OF PELLA, IOWA.

Letters Patent No. 79,154, dated June 23, 1868.

IMPROVED ANIMAL AND BIRD-TRAP.

*The Schedule referred to in these Letters Patent and making part of the same.*

TO ALL WHOM IT MAY CONCERN:

Be it known that I, GREENVILLE CARTER STAMPER, of Pella, in the county of Marion, and State of Iowa, have invented a new and improved Self-Setting Animal and Bird-Trap; and I do hereby declare that the following is a full, clear, and exact description of the construction and operation of the same, reference being had to the annexed drawings, (making a part of this specification,) in which—

Figure 1 is an end elevation, a portion of the wall being broken away.

Figure 2 is an end elevation, when set for birds.

Figure 3 is a cross-section.

Figure 4 is a detached sectional view, showing the adjusting-apparatus.

This invention relates to that class of traps which are actuated by springs, and which are provided with a movable part that, when the trap is sprung, pushes the animal into a receptacle provided for the purpose.

The invention consists in a new arrangement of said parts, and a new device for setting, springing, and adjusting the same to different classes of animals and birds, and in making the receptacles detachable and removable, for the purposes hereinafter set forth.

In the drawings, A A' represent the body of the trap, the part A' being removable, and, when removed, leaving the form of the trap as seen in figs. 2 and 3. B is a wheel, arranged lengthwise of the trap A A', operated by a convolute spring, E, on one end, and provided at the other end with a ratchet, $a$, pawl, $a^1$, spring, $a^2$, for keeping the pawl in contact with the ratchet, and key, $a^3$, for holding the pawl away from the ratchet, when required.

The wheel B is provided with a set of radial plates, $b\ b\ b$, attached to it like spokes, and extending the whole length of the case A A'. C is a platform under the removable part A' of the case, and D is an apartment or chamber under the fixed part A of said case. The radial plates $b\ b$ of the wheel B are so arranged and adjusted that the wheel extends from the inner edge of the platform to the central part of the concave roof-ceiling over it, cutting off all communication between the chamber D and the space under the part A' of the case, when the wheel is in the position shown in figs. 1, 2, or 3. The apartment D communicates with an attachable and removable box, F, having a foraminated top, F', the passage $f$ between them having a trap-gate, $f'$, which the animal can push open, in order to pass into the box F, but which will automatically close after him, and cut off his return.

C' is the bait-box, attached to the platform C, as shown in fig. 3, and provided with a spur or hook, $c'$, to hold the bait, and $c$ is a catch or stop projecting upward from the inner edge of the platform, in such a manner that the radial plates of the wheel B come in contact with it, and thereby the wheel is prevented from revolving.

When a bird or animal comes upon the platform C, in quest of the bait in the box C', or for any other purpose, his weight is designed to press the stop $c$ down, or otherwise move it, so that it will be disconnected from the radial plate in contact with it, when the spring E will cause the wheel to revolve on its axis with great force, and the radial plate next in rear of that one which had been in contact with the stop $c$, sweeps down across the platform, and pushes the animal off of the platform into the chamber D. Before the wheel can revolve any further, the stop $c$, relieved by the expulsion of the animal from the platform, rises and intercepts the radial plate, the operation of which has just been described, and thus sets the trap again automatically.

The animal finding himself in the dark chamber D, is prevented from returning to the platform, both by the force of the spring E, and by the operation of the ratchet and pawl $a\ a'$, and seeing light through the passage $f$, he immediately makes his exit into the independent box F, which, when sufficiently full, can be detached and removed for the purpose of killing the game.

G is a deep water-tight box, corresponding usually in width to the trap, and of any length that may be preferred. When the box F has been filled with game, and it is desirable to empty it, I fill or partially fill the box G with water, and set the box F upon it. By inspecting fig. 1, it will be seen that the bottom of box F is composed of two trap-doors, which open downward, and are supported in the position shown in the drawing referred to, by means of pins or dowels passing through the edge of the end wall into the ends of the trap-doors.

The box F having been placed on the tank G, the operator removes the dowels, and the weight of the animal opens the trap-doors and precipitates him into the water below, in which he is drowned. The box F is made of the same length as the tank G, and of the same or a little less width.

In setting the trap for birds, the part A' of the case is removed, and every alternate radial plate is also removed, in order that the bird may freely approach the platform C from any quarter. Previous to setting the trap for such game, a hole is dug in the ground, and the box G is inserted in it, as shown in fig. 3, the top of the box coming slightly below the surface of the ground. The trap is then placed on it, in the position shown in the drawing last referred to, the platform C coming exactly on a level with the surface. A removable sheet-metal bottom, $d$, which formed the floor of the chamber D, is then withdrawn, and the trap is baited and is ready to operate. The bird comes upon the platform, depresses it, and springs the trap, which sweeps her into the now bottomless chamber D, from which she falls into the box G.

All the parts which are in danger of being gnawed and injured or destroyed by the entrapped animals, may be lined with sheet metal or other suitable material, to protect them. The means which I preferably employ for adjusting the trap to game of different sizes, and for facilitating the springing of the trap, may be described as follows, being clearly represented in fig. 4:

The platform is pivoted along the edge opposite to the stop $c$, and its inner edge rises and falls, the stop $c$ being a simple knob or pin, projecting up from the edge of the platform. The inner edge of the platform rests upon a lever, M, provided with a friction-roller, $r$, and weight, $m$, by which the platform may be adjusted so as to be depressed, and the trap sprung more or less easily. When the weight is adjusted at the end of the long arm of the lever, an animal of considerable size might pass over the platform without springing it, but when placed near the fulcrum, or entirely removed, a mouse or small bird would at once spring the trap. The bait-hook $c'$ passes through the bottom or side of the bait-box, and is fixed to a lever, N, or may be an extension of the lever N. The latter is pivoted near its centre to a block, O, belonging to the frame of the trap, and independent of the platform C, and the other end of the lever is bent up towards the platform, and passes loosely through a staple in it, as seen at $n$. The effect of this arrangement will be that when the animal or bird is not sufficiently heavy to spring the platform by this weight, he will, by pulling upon the bait, draw the platform down, and insure his being caught.

A spring, $s$, may, if desired, be employed to counterbalance the weight of the platform, and may be made adjustable, so as to bear up the platform with any required degree of force. $t\ t$ are hooks or hasps, and $t'\ t'$ dowels, by which the box F is held in place when in use, as shown in fig. 1. $u$ is a hasp, by which the part A' is secured in position.

Having thus described my invention, what I claim as new, and desire to secure by Letters Patent, is—

1. The combination and arrangement of the fixed part A, and removable half, A', of the case or shell of the trap, with the wheel B and platform C, as and for the purposes set forth.

2. The box E, when constructed with foraminous top, trap-door bottom, and trap-guard $f'$, and used in connection with the chamber D, in which the animal is caught, and the box G, in which he is drowned, in the manner and for the purposes set forth.

3. The employment of the underground box G, in connection with the bottomless chamber D, and for the purposes set forth.

4. The combination of the platform C and bait-hook $c'$, with the lever N and beam O, as and for the purpose set forth.

5. The combination of the platform C and weighted lever M, substantially as and for the purpose set forth.

GREENVILLE CARTER STAMPER.

Witnesses:
CHAS. A. PETTIT,
SOLON C. KEMON.